US012777570B2

(12) United States Patent
Severance et al.

(10) Patent No.: US 12,777,570 B2
(45) Date of Patent: Oct. 27, 2026

(54) PLASMA HAND TORCH WITH CAP-IN-PLACE LIMIT SWITCH

(71) Applicant: Lincoln Global, Inc., Santa Fe Springs, CA (US)

(72) Inventors: Wayne S. Severance, Darlington, SC (US); Praveen K. Namburu, Little Elm, TX (US)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 766 days.

(21) Appl. No.: 18/138,807

(22) Filed: Apr. 25, 2023

(65) Prior Publication Data

US 2024/0365462 A1 Oct. 31, 2024

(51) Int. Cl.
*H05H 1/34* (2006.01)

(52) U.S. Cl.
CPC .................................. *H05H 1/3473* (2021.05)

(58) Field of Classification Search
CPC .......................... H05H 1/3473; H05H 2245/60
See application file for complete search history.

(56) References Cited

U.S. PATENT DOCUMENTS 3,958,098 A 5/1976 Tizuka et al.
4,973,816 A 11/1990 Haberman
6,271,497 B1 8/2001 Zapletal
6,362,450 B1 * 3/2002 Severance, Jr. .......... H05H 1/34 219/121.51
6,365,868 B1 4/2002 Borowy et al.
8,624,150 B2 * 1/2014 Simek ..................... F23D 14/42 219/121.48
11,310,901 B2 * 4/2022 Namburu ........... B23K 35/0205
2008/0217305 A1 9/2008 Sanders
2012/0061355 A1 3/2012 Simek et al.

OTHER PUBLICATIONS

Lincoln Electric; FlexCut 125 Operator's Manual; Dated Nov. 2016; pp. 1-62.
Lincoln Electric; "FlexCut 125 Air Plasma Cutting System;" Dated Apr. 2019; pp. 1-8.

* cited by examiner

*Primary Examiner* — Courtney D Heinle
*Assistant Examiner* — Danielle M. Christensen
(74) *Attorney, Agent, or Firm* — Brad C. Spencer

(57) ABSTRACT

A plasma torch includes a torch housing, and an anode body at least partially located within the torch housing. A cathode body extends axially within the anode body. An electrode is electrically connected to the cathode body at a distal portion of the cathode body. An electrical power terminal is attached to the cathode body at a proximal portion of the cathode body within the torch housing. An electrical isolator at least partially surrounds the cathode body within the torch housing and has a slot at the proximal portion of the cathode body that receives the electrical power terminal. A cap-in-place limit switch is attached to the electrical isolator within the torch housing.

22 Claims, 8 Drawing Sheets

PLASMA HAND TORCH WITH CAP-IN-PLACE LIMIT SWITCH

BACKGROUND OF THE INVENTION

Field of the Invention

The present invention relates to plasma arc cutting torches, and in particular to hand-operated and machine-controlled plasma torches having a cap-in-place limit switch for deactivating the torch when certain components are not installed on the torch.

Description of Related Art

Hand-operated plasma arc cutting torches (hereinafter "plasma hand torches") are used to cut metal workpieces. A plasma hand torch is connected to a power supply via a cable. The plasma hand torch includes a handle and handle-mounted trigger for activating the cutting plasma. A cathode body and attached electrode energize a gas flow through the plasma hand torch to generate the plasma. A nozzle at the distal end of a torch body assembly directs the plasma toward the workpiece.

Consumables within a plasma torch, whether a hand torch or a machine-controlled torch, may be replaced from time to time by an operator. Examples of such consumables include the electrode, nozzle, swirl ring, etc. It is desirable that the plasma torch be disabled when consumables are replaced, so that the various exposed components within the torch remain de-energized even if the torch's trigger is accidentally activated. To ensure this, some plasma torches include a cap-in-place limit switch that enables operation of the plasma torch only when an outer retaining cap is installed on the torch. The outer retaining cap is an outer or exposed part of the torch that can hold the torch's nozzle and swirl ring in place. The outer retaining cap must be removed to replace the various consumables within the torch. The cap-in-place limit switch is an interlock device that senses whether or not the outer retaining cap is installed on the torch and prevents the power supply from energizing the components within the torch when the outer retaining cap is removed.

FIG. 1 shows a portion of a prior art machine-controlled plasma torch (i.e., not a hand torch). In particular, the prior art plasma torch is a model LC125M used with the FlexCut 125 plasma cutter manufactured by THE LINCOLN ELECTRIC COMPANY. Located within an outer housing (not shown) are an anode body 100 and a cathode body 102. An electrical isolator 104 surrounds the cathode body 102 and insulates the cathode body from the anode body 100. An electrical power terminal at the proximal end of the cathode body 102 conducts electrical current to the cathode body and an electrode (not shown) connected to the distal end of the cathode body. The outer retaining cap 106 extends downward or distal from the outer housing and can include an upper or proximal metal ring 108 (e.g., brass). Mounted to the top or proximal surface of the anode body 100 is a further electrical isolator 110. The cap-in-place limit switch 112 is mounted to the further electrical isolator 110 inside of the torch. The cap-in-place limit switch 112 is activated by a plunger 114. The plunger 114 trips the cap-in-place limit switch 112 to enable operation of the torch when the outer retaining cap 106 is installed on the torch. The cap-in-place limit switch 110 is wired to the power supply through the torch cable connected to the power supply.

The cap-in-place limit switch 110 has a range of operation that is specified or guaranteed by the manufacturer of the limit switch 110. The design tolerances of various components within the torch, including the outer retaining cap 106, the anode body 100, the metal ring 108, the further electrical isolator 110, and other components not shown, add up or equate to a tolerance stack that must be accounted for in the design of the torch, in order to guarantee that the cap-in-place limit switch 110 will operate. It would be desirable to reduce or minimize the number of components within the torch that add to the tolerance stack with respect to the operation of the cap-in-place limit switch 110.

BRIEF SUMMARY OF THE INVENTION

The following summary presents a simplified summary in order to provide a basic understanding of some aspects of the devices, systems and/or methods discussed herein. This summary is not an extensive overview of the devices, systems and/or methods discussed herein. It is not intended to identify critical elements or to delineate the scope of such devices, systems and/or methods. Its sole purpose is to present some concepts in a simplified form as a prelude to the more detailed description that is presented later.

In accordance with one aspect of the present invention, provided is a plasma torch. The plasma hand torch includes a torch housing, and an anode body at least partially located within the torch housing. A cathode body extends axially within the anode body. An electrode is electrically connected to the cathode body at a distal portion of the cathode body. An electrical power terminal is attached to the cathode body at a proximal portion of the cathode body within the torch housing. An electrical isolator at least partially surrounds the cathode body within the torch housing and has a slot at the proximal portion of the cathode body that receives the electrical power terminal. A cap-in-place limit switch is attached to the electrical isolator within the torch housing.

In accordance with another aspect of the present invention, provided is a plasma hand torch. The plasma hand torch includes a torch handle, and an anode body at least partially located within the torch handle. A cathode body extends axially within the anode body. An electrode is electrically connected to the cathode body at a distal portion of the cathode body. An electrical power terminal is attached to the cathode body at a proximal portion of the cathode body within the torch handle. A bias member applies a bias force to the cathode body in a distal direction. An electrical isolator at least partially surrounds the cathode body within the torch handle. The electrical isolator limits axial movement of the cathode body and the electrical power terminal in the distal direction. A cap-in-place limit switch is attached to the electrical isolator within the torch handle.

In accordance with another aspect of the present invention, provided is a plasma torch. The plasma hand torch includes a torch housing, and an anode body at least partially located within the torch housing. A cathode body extends axially within the anode body. An electrode is electrically connected to the cathode body at a distal portion of the cathode body. An electrical power terminal is attached to the cathode body at a proximal portion of the cathode body within the torch housing. An electrical isolator is mounted atop the anode body and at least partially surrounds the cathode body within the torch housing. The electrical isolator has a slot at the proximal portion of the cathode body that receives the electrical power terminal. The electrical isolator limits axial movement of the cathode body and the electrical power terminal in a distal direction. A cap-in-place limit switch is attached to the electrical isolator within the torch housing.

In accordance with another aspect of the present invention, provided is a plasma hand torch. The plasma hand torch includes a torch handle, and an anode body at least partially located within the torch handle. A cathode body extends axially within the anode body. An electrode is electrically connected to the cathode body at a distal portion of the cathode body. An electrical power terminal is attached to the cathode body at a proximal portion of the cathode body within the torch handle. A bias member applies a bias force to the cathode body in a distal direction. An electrical isolator is mounted atop the anode body and at least partially surrounds the cathode body within the torch handle. The electrical isolator limits axial movement of the cathode body and the electrical power terminal in a distal direction. A cap-in-place limit switch is attached to the electrical isolator within the torch handle.

BRIEF DESCRIPTION OF THE DRAWINGS

The foregoing and other aspects of the invention will become apparent to those skilled in the art to which the invention relates upon reading the following description with reference to the accompanying drawings, in which.

DETAILED DESCRIPTION OF THE INVENTION

Figure 1:
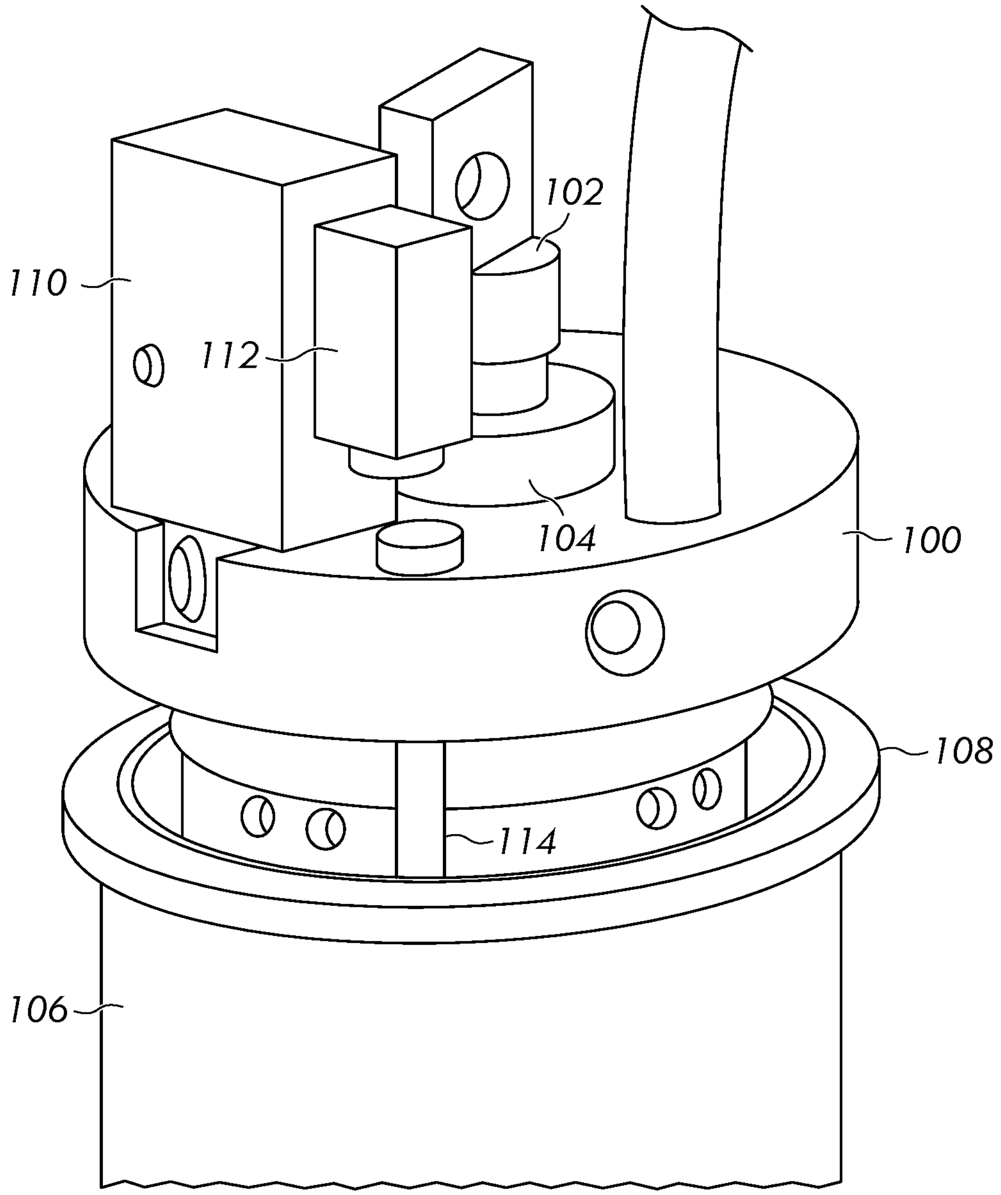
FIG. 1 (PRIOR ART)
FIG. 1 shows a portion of a prior art plasma hand torch.

The present invention relates to plasma arc cutting torches, and in particular to plasma hand torches and machine-controlled torches having a cap-in-place limit switch for deactivating the torch when the outer retaining cap is removed. The present invention will now be described with reference to the drawings, wherein like reference numerals are used to refer to like elements throughout. It is to be appreciated that the various drawings are not necessarily drawn to scale from one figure to another nor inside a given figure, and in particular that the size of the components are arbitrarily drawn for facilitating the understanding of the drawings. In the following description, for purposes of explanation, numerous specific details are set forth in order to provide a thorough understanding of the present invention. It may be evident, however, that the present invention can be practiced without these specific details. Additionally, other embodiments of the invention are possible and the invention is capable of being practiced and carried out in ways other than as described. The terminology and phraseology used in describing the invention is employed for the purpose of promoting an understanding of the invention and should not be taken as limiting.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. Any disjunctive word or phrase presenting two or more alternative terms, whether in the description of embodiments, claims, or drawings, should be understood to contemplate the possibilities of including one of the terms, either of the terms, or both terms. For example, the phrase "A or B" should be understood to include the possibilities of "A" or "B" or "A and B."

Figure 2:
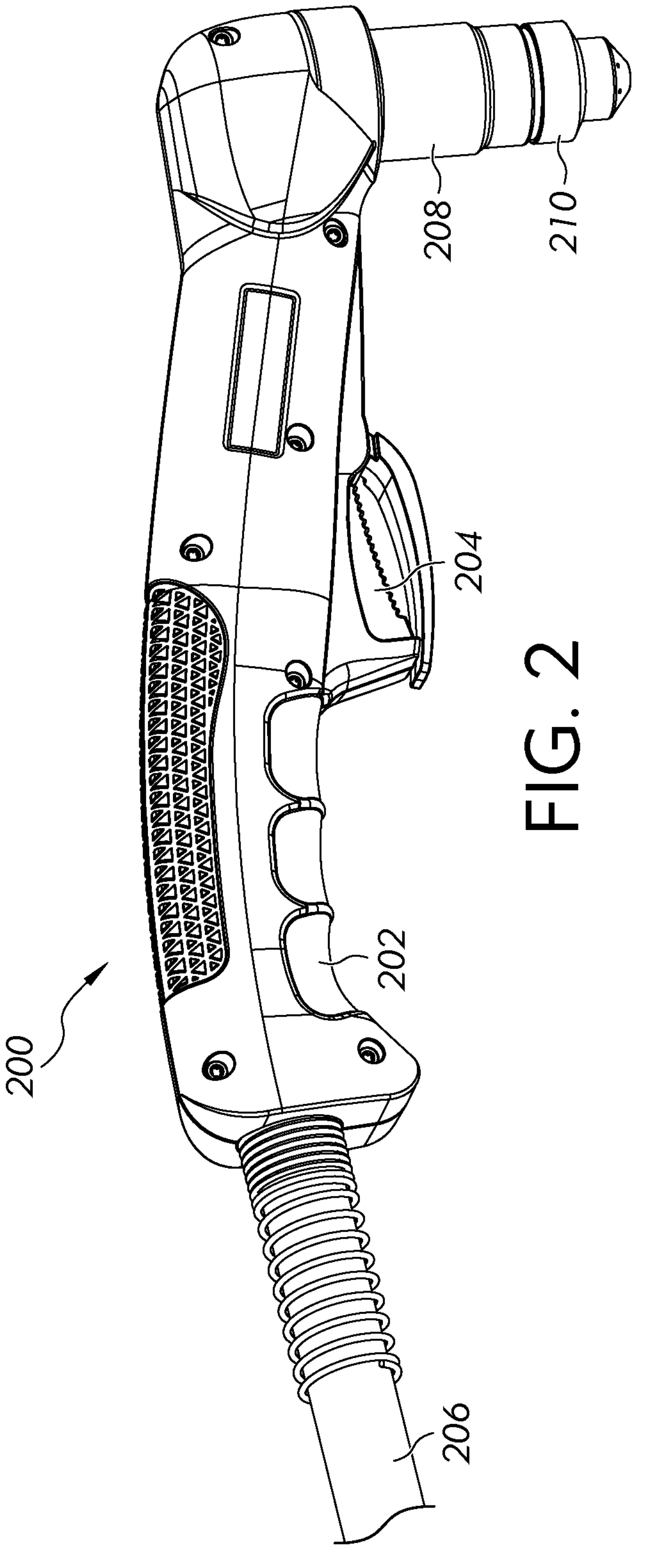
FIG. 2 shows a plasma hand torch.

FIG. 2 shows a plasma hand torch 200 according to an example embodiment of the present invention. The torch 200 includes a housing or handle 202 having a grip portion and a trigger 204 for activating and deactivating the plasma cutting jet. The handle 202 can be a clamshell style housing having left and right halves and a generally hollow interior for holding various torch components within the handle. A cable 206 extends from the torch 200 for connection to a plasma cutting power supply (not shown). Extending downward from the handle 202 in a distal direction are an outer retaining cap 208 and a shield cap 210. The shield cap 210 covers and protects the nozzle of the torch and directs shield gas around the plasma gas. The shield cap 210 is removable from the outer retaining cap 208. For example, the shield cap 210 threads on and off of the outer retaining cap 208 to conceal/expose the nozzle. The outer retaining cap 208 can be mounted on the anode body of the torch, such as by a threaded connection.

Figure 3:
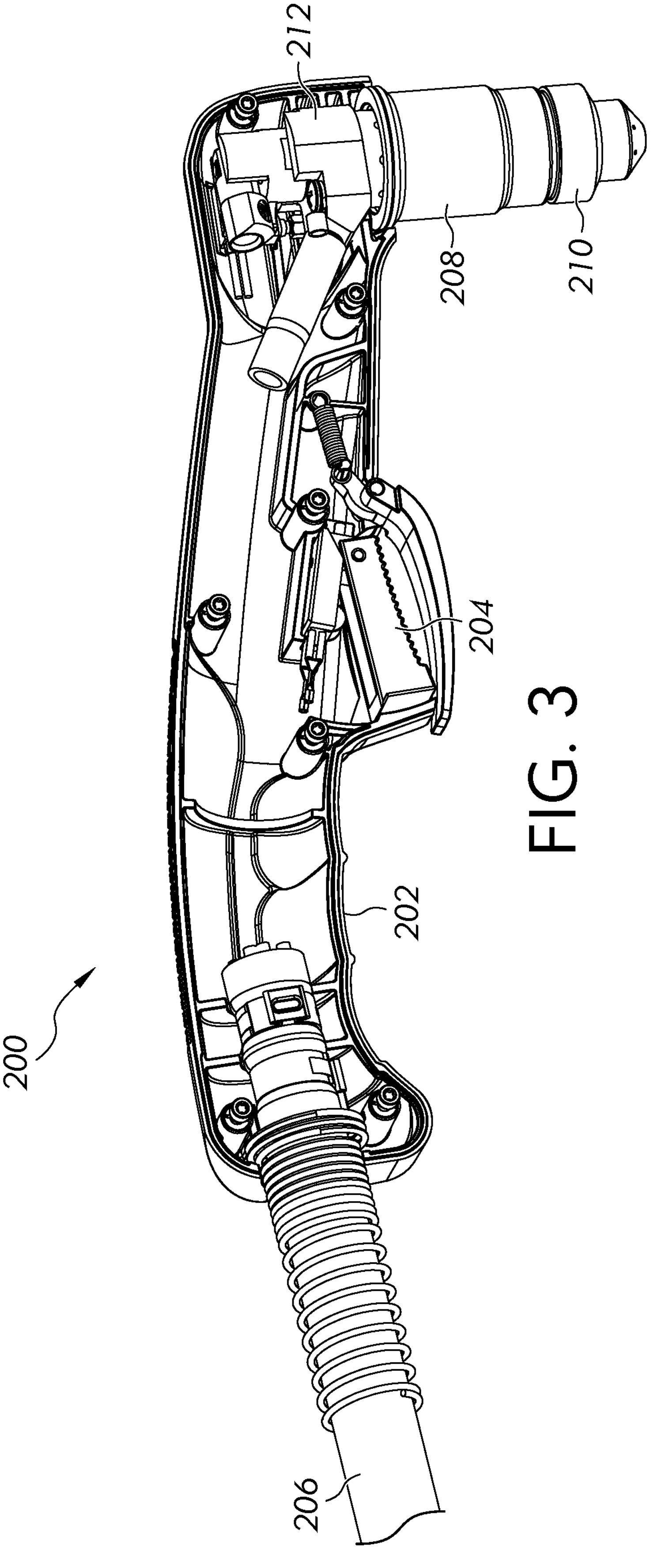
FIG. 3 shows the plasma hand torch with a portion of the handle removed.
Figure 4:
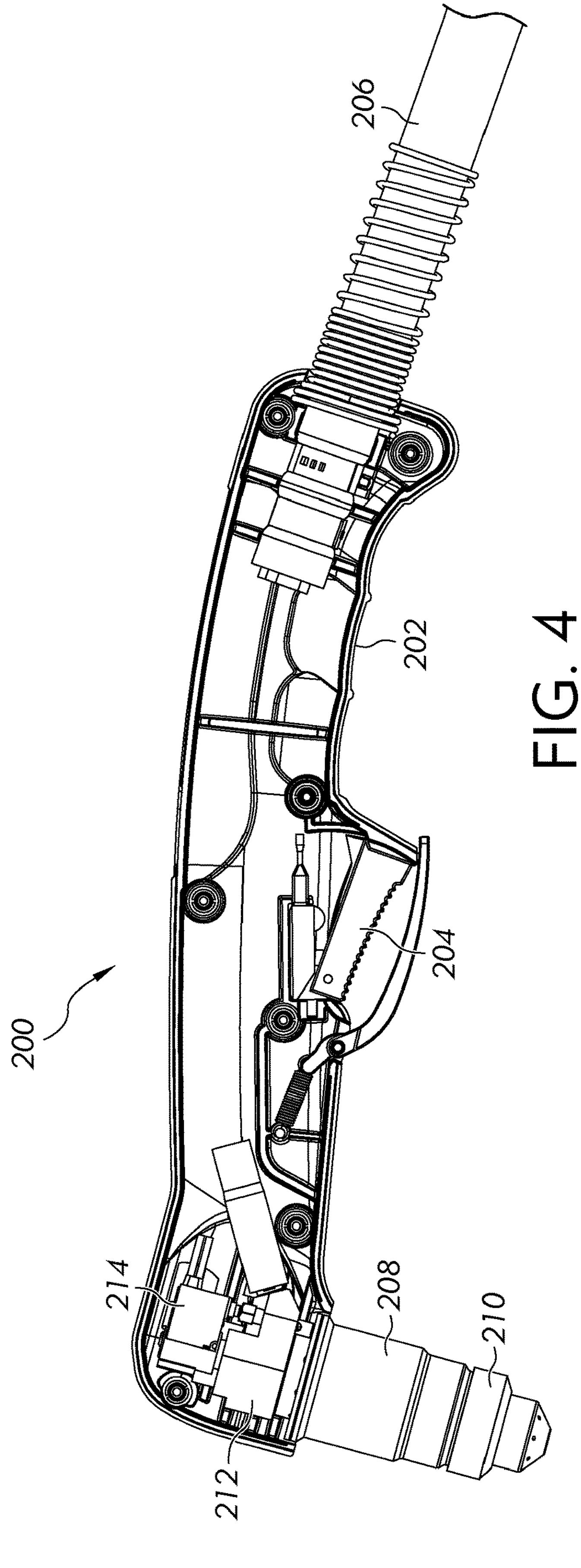
FIG. 4 shows the plasma hand torch with a portion of the handle removed.

FIG. 3 shows the plasma hand torch 200 with the right half of the handle removed, and FIG. 4 shows the torch with the left half of the handle removed. Some of the cabling within the handle 202 is excluded from FIGS. 3 and 4 for clarity in depicting other components of the torch. The anode body 212 can be seen in FIGS. 3 and 4. The anode body 212, outer retaining cap 208, and shield cap 210 are all located at the functional end or business end of the torch 200, and the anode body extends or projects outside of the handle 202 in the distal direction within the outer retaining cap. The cap-in-place limit switch 214 can be seen located within the torch handle 202 in FIG. 4.

Figure 6:
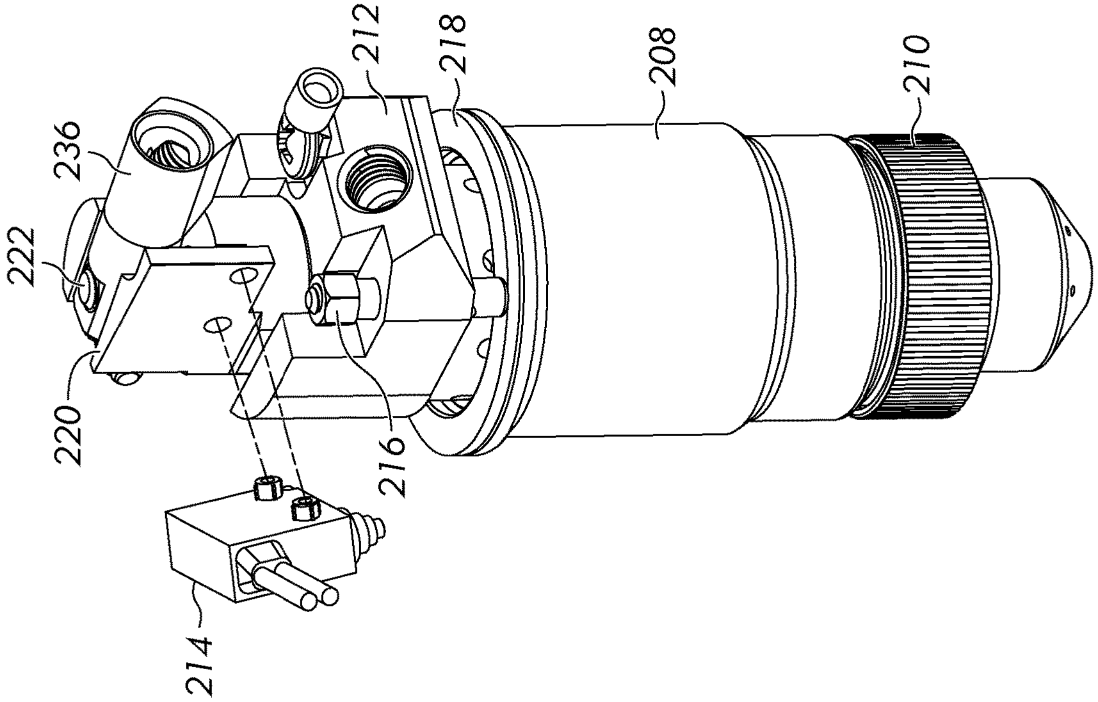
FIG. 6 is a perspective view of a portion of the plasma hand torch.
Figure 5:
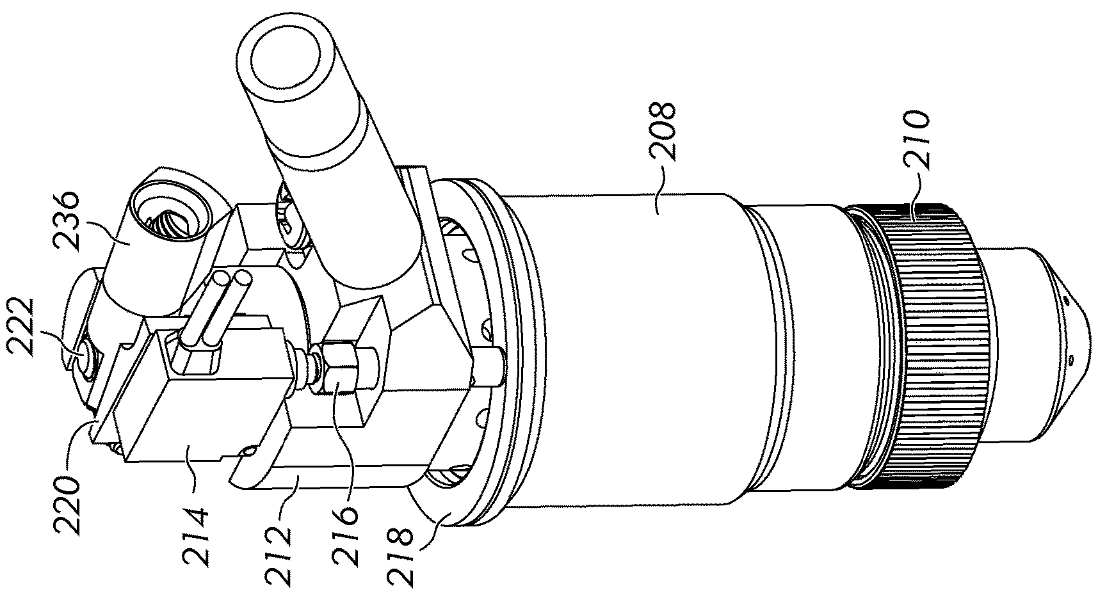
FIG. 5 is a perspective view of a portion of the plasma hand torch.
Figure 7:
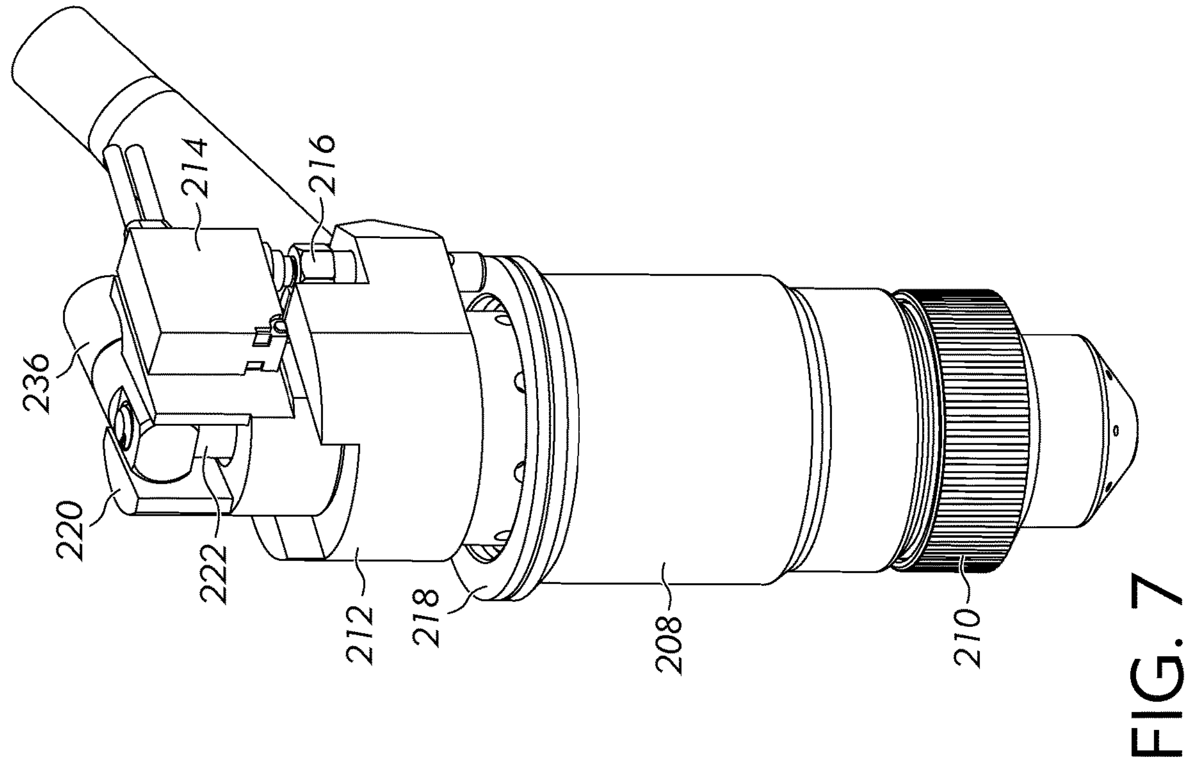
FIG. 7 is a perspective view of a portion of the plasma hand torch.

The functional end of the torch is defined by the location of the torch body assembly, which is shown in FIGS. 5-7. Electrical current and compressed air or a gas or gas mixture are conducted to the torch body assembly to create the plasma cutting arc. A portion of tubing for conveying compressed air or other gases to the anode body 212 can be seen in FIGS. 5 and 7 but is omitted in FIG. 6 (and also FIG. 8).

Located at the distal end of the torch body assembly is the shield cap 210, which is attached to (e.g., threaded upon) the outer retaining cap 208. The outer retaining cap 208 is attached to (e.g., threaded upon) the anode body 212. Because the outer retaining cap 208 is attached to the anode body 212 through which current flows during starting, the outer retaining cap 208 can have an inner metallic body and an outer electrically-insulating sheath. The electrically-insulating sheath of the outer retaining cap 208 can have the threads for mounting the shield cap 210 so that the shield cap is electrically isolated from the anode body 212.

When installed on the torch, the outer retaining cap 208 displaces a plunger 216 or other suitable actuation mechanism to trip the cap-in-place limit switch 214. In the example embodiment shown, the plunger 216 moves axially in a hole through the anode body 212. The outer retaining cap 208 has a radially-projecting rim or collar 218 at its proximal end that engages the distal end of the plunger 216 to push it upward toward and against the actuator of the cap-in-place limit switch 214.

The cap-in-place limit switch 214 is located at the proximal end of the torch body assembly within the handle. An example cap-in-place limit switch 214 is an OMRON D2HW style microswitch. Such switches provide a small, limited range of travel of the switch's actuator within which operation of the switch is guaranteed. In an example embodiment, the small, limited range of travel of the switch's actuator within which operation of the switch is guaranteed is 0.0434 inches. Accordingly, the dimensional tolerance stack of the torch components that impact the operation of the switch should fall within the small guaranteed operating range of the switch. As the number of components that impact the operation of the cap-in-place limit switch 214 increases, it becomes correspondingly more difficult to ensure that their accumulated dimensional tolerances will fall within the guaranteed operating range of the switch. It is desirable to keep the tolerance stack of the components that impact the operation of the switch within the switch's guaranteed operating range, and one way to do that is to reduce the number of components that impact the switch's operation. The present torch design does this by mounting the cap-in-place limit switch 214 to an electrical isolator 220 around the centrally-located cathode body 222, rather than to an isolator mounted to the anode body as shown in the prior art design of FIG. 1. The cap-in-place limit switch 214 needs to be isolated from both the anode body 212 and the cathode body 222 due to the high electrical currents normally flowing through the cathode body and flowing through the anode body during starting. By mounting the cap-in-place limit switch 214 to an electrical isolator 220 around the cathode body 222, fewer components add to the dimensional tolerance stack associated with the operation of the cap-in-place limit switch 214. For example, with respect to the torch shown in FIG. 1, dimensional tolerances of the anode body 100, the further electrical isolator 110 and upper metal ring 108 are eliminated from the tolerance stack associated with the cap-in-place limit switch 214 operation in the present torch design. Through the present torch design and because of the use of fewer parts (e.g., no need for an extra part to mount the switch or set the travel and orientation of the cathode body 222), space is conserved and thus help to package and reduce the overall size of the plasma torch head.

In an example embodiment, the dimensional tolerance stack of the torch components that impact the operation of the cap-in-place limit switch 214 is not greater than 0.0434 inches, such as between 0.030 inches and 0.0434 inches for example.

The cap-in-place limit switch 214 is attached to the electrical isolator 220 within the torch handle. One of ordinary skill in the art will appreciate various suitable methods for mounting the switch 214 to the electrical isolator 220. However as best seen in FIG. 6, in an example embodiment, the cap-in-place limit switch 214 has mounting posts that are press fit into corresponding holes and/or blind bores in the electrical isolator 220 to secure the switch to the isolator. When mounted to the isolator 220, a gap exists between the bottom of the limit switch 214 housing and the top of the anode body 212, isolating the limit switch from both the cathode body 222 and the anode body 212.

Figure 9:
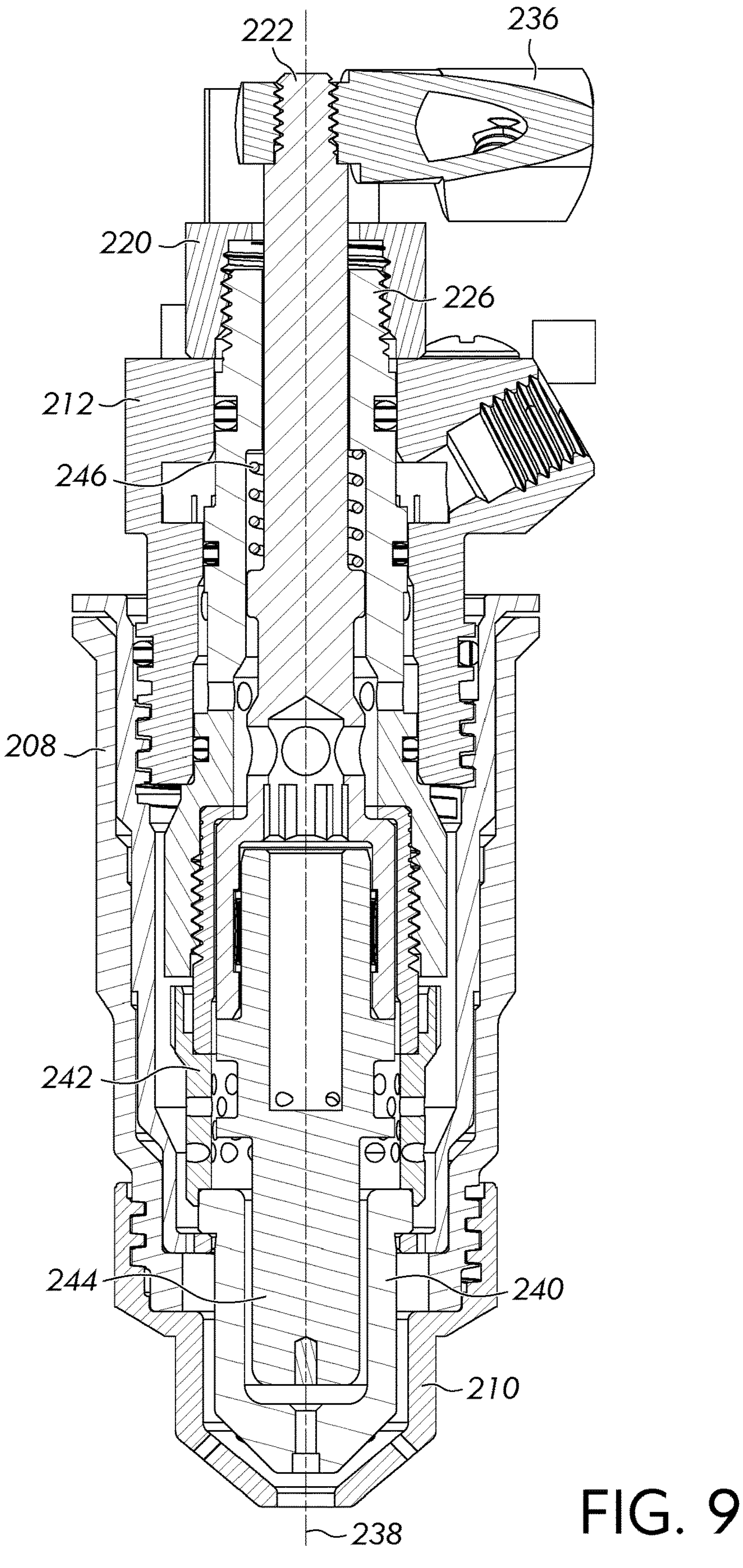
FIG. 9 is a cross-sectional view of a portion of the plasma hand torch.
Figure 10:
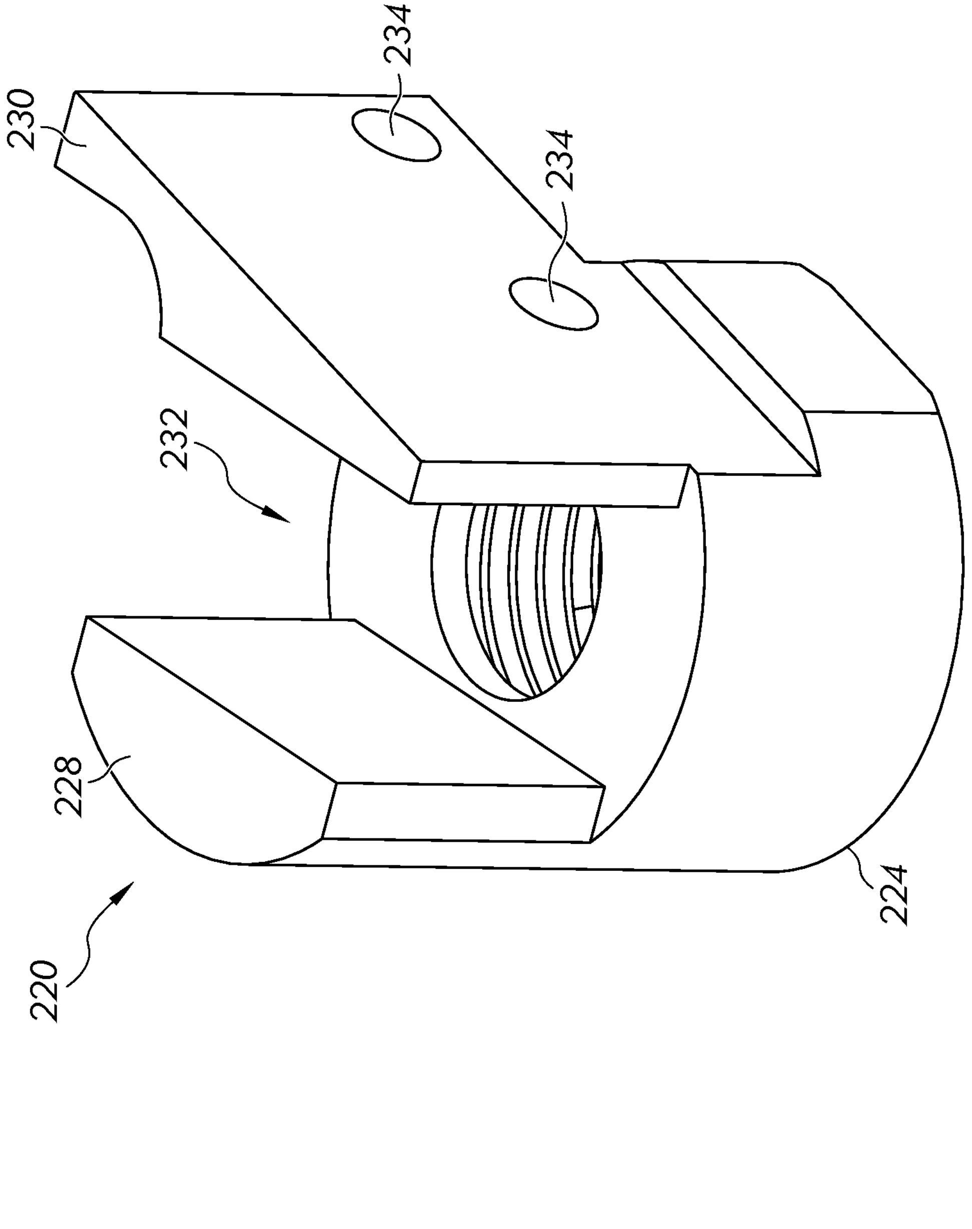
FIG. 10 is a perspective view of an electrical isolator of the plasma hand torch.

The electrical isolator 220 is mounted atop the anode body 212 and is located within the torch handle and extends proximal or above the anode body within the torch handle. The electrical isolator 220 surrounds a proximal portion of the cathode body 222 that extends upward through a bore in the anode body 212 and through a bore in the isolator. FIG. 10 provides a perspective view of just the electrical isolator 220. The electrical isolator 220 has a generally cylindrical and hollow base 224 through which the proximal portion of the cathode body projects. The interior walls of the base 224 are threaded to allow the isolator 220 to be threaded onto and thereby attached to a second electrical isolator 226 (FIG. 9) that passes through the anode body 212 (FIG. 9). The second electrical isolator 226 electrically insulates the cathode body 222 (FIG. 9) from the anode body 212 (FIG. 9). Returning to FIG. 10, the electrical isolator 220 further includes raised sidewalls 228, 230 that extend upward from the base 224 and form a slot 232 above the base. One of the raised sidewalls 230 projects radially forward of the circumferential edge of the base 224, to form a mounting surface for the cap-in-place limit switch, and includes the holes 234 and/or blind bores for the switch's mounting posts.

Returning to FIGS. 5-7, it can be seen that the proximal portion of the cathode body 222 projects upward into the slot formed by the two raised sidewalls of the electrical isolator 220. An electrical power terminal 236 is attached to the cathode body 222 at the proximal portion of the cathode body. The electrical power terminal 236 is located within the torch handle, as is the cap-in-place limit switch 214 and the electrical isolator 220. The electrical power terminal 236 conducts plasma cutting current to the cathode body 222. In an example embodiment, the proximal portion of the cathode body 222 has external threads that mate with a threaded hole in the in the electrical power terminal 236. The electrical power terminal 236 is received in the slot formed by the two raised sidewalls of the electrical isolator 220. A portion of the electrical power terminal 236 is located within the slot, and the electrical power terminal extends generally perpendicular to the longitudinal axis 238 (FIG. 9) of the cathode body 222. The electrical isolator 220 is located between the electrical power terminal 236 and the anode body 212.

Figure 8:
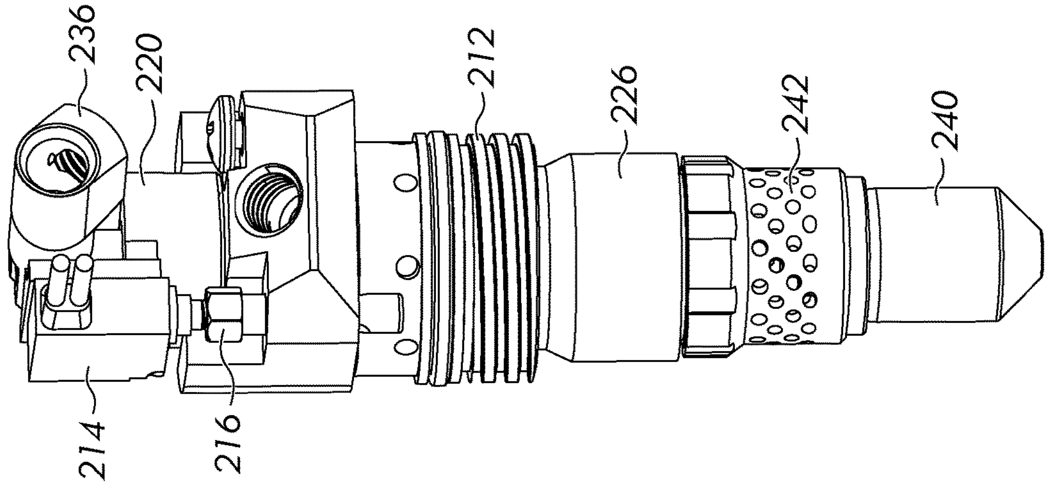
FIG. 8 is a perspective view of a portion of the plasma hand torch.

FIG. 8 shows the torch body assembly with the outer retaining cap and shield cap removed, exposing the nozzle 240 and the swirl ring 242 just above or proximal of the nozzle. The distal portion of the second electrical isolator 226, which projects downward from the interior of the anode body 212, can also be seen in FIG. 8. Threads on the distal portion of the anode body 212 are used to attach the outer retaining cap to the torch.

FIG. 9 is a cross-sectional view of the torch body assembly. It can be seen that the cathode body 222 extends axially within and through the anode body 212. An electrode 244 is electrically connected to the cathode body 222 at a distal portion of the cathode body. In the example embodiment shown, the torch is a retract start or blow back torch in which the cathode body 222 and electrode 244 are spring-biased in a distal direction against the nozzle 240, and air pressure during operation of the torch separates the electrode and nozzle. The torch body assembly includes a bias member, such as bias spring 246 that applies a bias force to the cathode body 222 in the distal direction toward the nozzle 240. However, in other embodiments, the torch need not be a retract start or blow back torch and the torch could employ other starting technologies as would be appreciated by one of ordinary skill in the art.

Because the torch is a retract start or blow back torch, the cathode body 222 can translate axially within the torch body assembly to a limited extent and the cathode body is axially movable within the electrical isolator 220. Distal or downward movement of the cathode body 222 due to the bias spring 246 is limited by the electrode 244 contacting the inner surface of the nozzle 240. If the nozzle is removed, further axial movement of the cathode body 222 in the distal direction is limited by the electrical isolator 220. More specifically, the upper surface of the isolator's base 224 between the two sidewalls 228, 230 (FIG. 10) limits the axial movement of the cathode body 222 and the electrical power terminal 236 in the distal direction because the upper surface of the isolator's base acts as a stop surface with respect to the electrical power terminal.

The electrical isolators 220, 226 can be made from high temperature plastics, such as a glass reinforced polyetherimide (thermoplastic polymer such as ULTEM 2300). A desirable property of ULTEM 2300 is that its coefficient of thermal expansion is very close to that of copper and brass, which are suitable metals for other portions of the torch body assembly. As noted above, the outer retaining cap 208 has an inner metallic body and an outer electrically-insulating sheath. The insulating sheath needs to be able to withstand some molten metal spatter during cutting operations. Glass reinforced thermoset plastics are suitable for the outer retaining cap's 208 electrically-insulating sheath and it can be machined out of glass filament wound epoxy tubing.

While embodiments of the present invention are discussed herein in the context of plasma hand torches, other embodiments of the invention are not limited thereto. For example, embodiments could be utilized in machine-controlled plasma torches that lack a manual trigger.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A plasma torch, comprising:

a torch housing;

an anode body at least partially located within the torch housing;

a cathode body extending axially within the anode body;

an electrode electrically connected to the cathode body at a distal portion of the cathode body;

an electrical power terminal attached to the cathode body at a proximal portion of the cathode body within the torch housing;

an electrical isolator at least partially surrounding the cathode body within the torch housing and having a slot at the proximal portion of the cathode body that receives the electrical power terminal; and a cap-in-place limit switch attached to the electrical isolator within the torch housing.

2. The plasma torch of claim 1, wherein the electrical isolator extends proximal of the anode body within the torch housing.

3. The plasma torch of claim 2, wherein the electrical power terminal is located within the slot and extends perpendicular to an axis of the cathode body.

4. The plasma torch of claim 1, further comprising:

a plunger that actuates the cap-in-place limit switch;

a nozzle;

a swirl ring; and an outer retaining cap that moves the plunger axially toward the cap-in-place limit switch attached to the electrical isolator, when the outer retaining cap is installed on the plasma torch.

5. The plasma torch of claim 1, wherein the electrical isolator is a first electrical isolator and wherein the plasma torch further comprising a second electrical isolator passing through the anode body, wherein the first electrical isolator is threaded onto the second electrical isolator.

6. A plasma hand torch, comprising:

a torch handle;

an anode body at least partially located within the torch handle;

a cathode body extending axially within the anode body;

an electrode electrically connected to the cathode body at a distal portion of the cathode body;

an electrical power terminal attached to the cathode body at a proximal portion of the cathode body within the torch handle;

a bias member that applies a bias force to the cathode body in a distal direction;

an electrical isolator at least partially surrounding the cathode body within the torch handle, wherein the electrical isolator limits axial movement of the cathode body and the electrical power terminal in the distal direction; and a cap-in-place limit switch attached to the electrical isolator within the torch handle.

7. The plasma hand torch of claim 6, wherein the electrical isolator extends proximal of the anode body within the torch handle.

8. The plasma hand torch of claim 7, wherein the electrical isolator is located between the anode body and the electrical power terminal.

9. The plasma hand torch of claim 6, further comprising:

a plunger that actuates the cap-in-place limit switch;

a nozzle;

a swirl ring; and an outer retaining cap that moves the plunger axially toward the cap-in-place limit switch attached to the electrical isolator, when the outer retaining cap is installed on the plasma hand torch.

10. The plasma hand torch of claim 6, wherein the electrical isolator is a first electrical isolator and wherein the plasma hand torch further comprising a second electrical isolator passing through the anode body, wherein the first electrical isolator is threaded onto the second electrical isolator.

11. A plasma torch, comprising:

a torch housing;

an anode body at least partially located within the torch housing;

a cathode body extending axially within the anode body;

an electrode electrically connected to the cathode body at a distal portion of the cathode body;

an electrical power terminal attached to the cathode body at a proximal portion of the cathode body within the torch housing;

an electrical isolator mounted atop the anode body and at least partially surrounding the cathode body within the torch housing and having a slot at the proximal portion of the cathode body that receives the electrical power terminal, wherein the electrical isolator limits axial movement of the cathode body and the electrical power terminal in a distal direction; and a cap-in-place limit switch attached to the electrical isolator within the torch housing.

12. The plasma torch of claim 11, wherein the electrical isolator extends proximal of the anode body within the torch housing.

13. The plasma torch of claim 12, wherein the electrical power terminal is located within the slot and extends perpendicular to an axis of the cathode body.

14. The plasma torch of claim 11, further comprising:

a plunger that actuates the cap-in-place limit switch;

a nozzle;

a swirl ring; and an outer retaining cap that moves the plunger axially toward the cap-in-place limit switch attached to the electrical isolator, when the outer retaining cap is installed on the plasma torch.

15. The plasma torch of claim 11, wherein the electrical isolator is a first electrical isolator and wherein the plasma torch further comprising a second electrical isolator passing through the anode body, wherein the first electrical isolator is threaded onto the second electrical isolator.

16. The plasma torch of claim 11, wherein the cathode body is axially movable within the electrical isolator.

17. A plasma hand torch, comprising:

a torch handle;

an anode body at least partially located within the torch handle;

a cathode body extending axially within the anode body;

an electrode electrically connected to the cathode body at a distal portion of the cathode body;

an electrical power terminal attached to the cathode body at a proximal portion of the cathode body within the torch handle;

a bias member that applies a bias force to the cathode body in a distal direction;

an electrical isolator mounted atop the anode body and at least partially surrounding the cathode body within the torch handle, wherein the electrical isolator limits axial movement of the cathode body and the electrical power terminal in a distal direction; and a cap-in-place limit switch attached to the electrical isolator within the torch handle.

18. The plasma hand torch of claim 17, wherein the electrical isolator extends proximal of the anode body within the torch handle.

19. The plasma hand torch of claim 18, wherein the electrical isolator is located between the anode body and the electrical power terminal.

20. The plasma hand torch of claim 17, further comprising:

a plunger that actuates the cap-in-place limit switch;

a nozzle;

a swirl ring; and an outer retaining cap that moves the plunger axially toward the cap-in-place limit switch attached to the electrical isolator, when the outer retaining cap is installed on the plasma hand torch.

21. The plasma hand torch of claim 17, wherein the electrical isolator is a first electrical isolator and wherein the plasma hand torch further comprising a second electrical isolator passing through the anode body, wherein the first electrical isolator is threaded onto the second electrical isolator.

22. The plasma hand torch of claim 17, wherein the cathode body is axially movable within the electrical isolator.

* * * * *